(12) United States Patent
Pina et al.

(10) Patent No.: US 9,325,236 B1
(45) Date of Patent: Apr. 26, 2016

(54) CONTROLLING POWER FACTOR IN A SWITCHING POWER CONVERTER OPERATING IN DISCONTINUOUS CONDUCTION MODE

(71) Applicant: KONINKLIJKE PHILIPS N.V., Eindhoven (NL)

(72) Inventors: Jean-Charles Pina, Austin, TX (US); Robert T. Grisamore, Austin, TX (US); John L. Melanson, Austin, TX (US); Yanhui Xie, Austin, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/539,210

(22) Filed: Nov. 12, 2014

(51) Int. Cl.
  *H02M 1/42* (2007.01)
  *H02M 3/335* (2006.01)
  *H05B 33/08* (2006.01)

(52) U.S. Cl.
  CPC ........ *H02M 1/4208* (2013.01); *H02M 3/33523* (2013.01); *H05B 33/0815* (2013.01)

(58) Field of Classification Search
  CPC ............... H02M 1/4208; H02M 3/335; H05B 33/0815; H05B 37/02
  See application file for complete search history.

(56) References Cited

U.S. PATENT DOCUMENTS

| | | |
|---|---|---|
| 3,790,878 A | 2/1974 | Brokaw |
| 4,677,366 A | 6/1987 | Wilkinson et al. |
| 4,683,529 A | 7/1987 | Bucher |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |

(Continued)

FOREIGN PATENT DOCUMENTS

| | | |
|---|---|---|
| EP | 0536535 A1 | 4/1993 |
| EP | 0636889 A1 | 1/1995 |

(Continued)

OTHER PUBLICATIONS

Su, et al, Ultra Fast Fixed-Frequency Hysteretic Buck Converter with Maximum Charging Current Control and Adaptive Delay Compensation for DVS Applications, IEEE Journal of Solid-State Circuits, vol. 43, No. 4, Apr. 2008, pp. 815-822, Hong Kong University of Science and Technology, Hong Kong, China.

(Continued)

*Primary Examiner* — Douglas W Owens
*Assistant Examiner* — Raymond R Chai (57) ABSTRACT

A power system includes a controller to control a switching power converter, and the controller is configured to automatically transition operation of the switching power converter, during each cycle of an input voltage to the switching power converter, between operating in discontinuous conduction mode and critical conduction mode.

14 Claims, 7 Drawing Sheets

(56) References Cited

U.S. PATENT DOCUMENTS

| | | |
|---|---|---|
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Itwasa |
| 6,628,106 B1 | 9/2003 | Batarseh et al. |
| 6,657,417 B1 | 12/2003 | Hwang |
| 6,696,803 B2 | 2/2004 | Tao et al. |
| 6,724,174 B1 | 4/2004 | Esteves et al. |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu |
| 7,554,473 B2 | 6/2009 | Melanson |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 | 11/2010 | Hunt et al. |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 | 5/2012 | Sims et al. |
| 8,193,717 B2 | 6/2012 | Leiderman |
| 8,222,772 B1 | 7/2012 | Vinciarelli |
| 8,242,764 B2 | 8/2012 | Shimizu et al. |
| 8,369,109 B2 | 2/2013 | Niedermeier et al. |
| 8,441,210 B2 | 5/2013 | Shteynberg et al. |
| 8,536,799 B1 | 9/2013 | Grisamore et al. |
| 8,610,364 B2 | 12/2013 | Melanson et al. |
| 8,803,439 B2 | 8/2014 | Stamm et al. |
| 8,816,593 B2 | 8/2014 | Lys et al. |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2006/0214603 A1 | 9/2006 | Oh et al. |
| 2007/0103949 A1 | 5/2007 | Tsuruya |
| 2008/0018261 A1 | 1/2008 | Kastner |
| 2008/0043504 A1 | 2/2008 | Ye |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Femo |
| 2009/0243582 A1 | 10/2009 | Irissou et al. |
| 2009/0295300 A1 | 12/2009 | King |
| 2010/0128501 A1 | 5/2010 | Huang et al. |
| 2010/0238689 A1 | 9/2010 | Fei et al. |
| 2010/0244793 A1 | 9/2010 | Caldwell |
| 2011/0110132 A1 | 5/2011 | Rausch |
| 2011/0199793 A1 | 8/2011 | Kuang et al. |
| 2011/0276938 A1 | 11/2011 | Perry et al. |
| 2011/0291583 A1 | 12/2011 | Shen |
| 2011/0309760 A1 | 12/2011 | Beland et al. |
| 2012/0056551 A1 | 3/2012 | Zhu et al. |
| 2012/0146540 A1 | 6/2012 | Khayat et al. |
| 2012/0153858 A1* | 6/2012 | Melanson et al. ............ 315/279 |
| 2012/0187997 A1 | 7/2012 | Liao et al. |
| 2012/0248998 A1 | 10/2012 | Yoshinaga |
| 2012/0320640 A1 | 12/2012 | Baurle et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 1213823 A2 | 6/2002 |
| EP | 1289107 A3 | 8/2002 |
| EP | 1962263 A2 | 8/2008 |
| EP | 2232949 | 9/2010 |
| EP | 2257124 A1 | 12/2010 |
| JP | 2008053181 A | 3/2006 |
| WO | 01/84697 A2 | 11/2001 |
| WO | 2004/051834 A1 | 6/2004 |
| WO | 20060013557 A1 | 2/2006 |
| WO | 2006/022107 A1 | 3/2006 |
| WO | 2007016373 A3 | 2/2007 |
| WO | 2008/004008 A2 | 1/2008 |
| WO | 20080152838 A2 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.

(56) References Cited

OTHER PUBLICATIONS

Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.

Texas Instruments, High Performance Power Factor Preregulator, UC2855A/B and UC3855A/B, SLUS328B, Jun. 1998, Revised Oct. 2005, pp. 1-14, Dallas, TX, USA.

Balogh, Laszlo, et al,Power-Factor Correction with Interleaved Boost Converters in Continuous-Inductr-Current Mode, 1993, IEEE, pp. 168-174, Switzerland.

Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.

Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.

Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Infineon Technologies AG, Standalone Power Factor Correction (PFC) Controller in Continuous Conduction Mode (CCM), Infineon Power Management and Supply, CCM-PFC, ICE2PCS01, ICE2PCS01G, Version 2.1, Feb. 6, 2007, p. 1-22, Munchen, Germany.

Lu, et al, Bridgeless PFC Implementation Using One Cycle Control Technique, International Rectifier, 2005, pp. 1-6, Blacksburg, VA, USA.

Brown, et al, PFC Converter Design with IR1150 One Cycle Control IC, International Rectifier, Application Note AN-1077, pp. 1-18, El Segundo CA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA.

Lai, Z., et al, A Family of Power-Factor-Correction Controller, Applied Power Electronics Conference and Exposition, 1997. APEC '97 Conference Proceedings 1997., Twelfth Annual, vol. 1, pp. 66-73, Feb. 23-27, 1997, Irvine, CA.

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.

Linear Technology, Single Switch PWM Controller with Auxiliary Boost Converter, Linear Technology Corporation, Data Sheet LT1950, pp. 1-20, Milpitas, CA, USA.

Linear Technology, Power Factor Controller, Linear Technology Corporation, Data Sheet LT1248, pp. 1-12, Milpitas, CA, USA.

Supertex, Inc., HV9931 Unity Power Factor LED Lamp Driver, Supertex, Inc., Application Note AN-H52, 2007, pp. 1-20, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Erickson, Robert W., et al, Fundamentals of Power Electronics, Second Edition, Chapter 6, 2001, pp. 131-184, Boulder CO, USA.

STMicroelectronics, CFL/TL Ballast Driver Preheat and Dimming L6574, Sep. 2003, pp. 1-10, Geneva, Switzerland.

Fairchild Semiconductor, 500W Power-Factor-Corrected (PFC) Converter Design with FAN4810, Application Note 6004, Rev. 1.0.1, Oct. 31, 2003, pp., 1-14, San Jose, CA, USA.

Fairfield Semiconductor, Power Factor Correction (PFC) Basics, Application Note 42047, Rev. 0.9.0, Aug. 19, 2004, pp. 1-11, San Jose, CA, USA.

Fairchild Semiconductor, Design of Power Factor Correction Circuit Using FAN7527B, Application Note AN4121, Rev. 1.0.1, May 30, 2002, pp. 1-12, San Jose, CA, USA.

Fairchild Semiconductor, Low Start-Up Current PFC/PWM Controller Combos FAN4800, Rev. 1.0.6, Nov. 2006, pp. 1-20, San Jose, CA, USA.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Fairchild Semiconductor, ZVS Average Current PFC Controller Fan 4822, Rev. 1.0.1, Aug. 10, 2001, pp. 1-10, San Jose, CA, USA.

Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.

Philips Semiconductors, 90W Resonant SMPS with TEA1610 Swing Chip, Application Note AN99011, Sep. 14, 1999, pp. 1-28, The Netherlands.

STMicroelectronics, Advanced Transition-Mode PFC Controller L6563 and L6563A, Mar. 2007, pp. 1-40, Geneva, Switzerland.

ON Semiconductor, Power Factor Controller for Compact and Robust, Continuous Conduction Mode Pre-Converters, NCP1654, Mar. 2007, Rev. PO, pp. 1-10, Denver, CO, USA.

Fairchild Semiondctor, Simple Ballast Controller, KA7541, Rev. 1.0.3, Sep. 27, 2001, pp. 1-14, San Jose, CA, USA.

Fairchild Semiconductor, Power Factor Controller, ML4812, Rev. 1.0.4, May 31, 2001, pp. 1-18, San Jose, CA, USA.

Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.

Freescale Semiconductor, Dimmable Light Ballast with Power Factor Correction, Designer Reference Manual, DRM067, Rev. 1, Dec. 2005, M68HC08 Microcontrollers, pp. 1-72, Chandler, AZ, USA.

Freescale Semiconductor, Design of Indirect Power Factor Correction Using 56F800/E, Freescale Semiconductor Application Note, AN1965, Rev. 1, Jul. 2005, pp. 1-20, Chandler, AZ, USA.

Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, AZ, USA.

Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.

Renesas, PFC Control IC R2A20111 Evaluation Board, Application Note R2A20111 EVB, all pages, Feb. 2007, Rev. 1.0, pp. 1-39, Tokyo, Japan.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Noon, Jim, High Performance Power Factor Preregulator UC3855A/B, Texas Instruments Application Report, SLUA146A, May 1996—Revised Apr. 2004, pp. 1-35, Dallas TX, USA.

NXP Semiconductors, TEA1750, GreenChip III SMPS Control IC Product Data Sheet, Rev.01, Apr. 6, 2007, pp. 1-29, Eindhoven, The Netherlands.

Turchi, Joel, Power Factor Correction Stages Operating in Critical Conduction Mode, ON Semiconductor, Application Note AND8123/D, Sep. 2003—Rev. 1, pp. 1-20, Denver, CO, USA.

(56) References Cited

OTHER PUBLICATIONS

ON Semiconductor, GreenLine Compact Power Factor Controller: Innovative Circuit for Cost Effective Solutions, MC33260, Semiconductor Components Industries, Sep. 2005—Rev. 9, pp. 1-22, Denver, CO, USA.

ON Semiconductor, Enhanced, High Voltage and Efficient Standby Mode, Power Factor Controller, NCP1605, Feb. 2007, Rev. 1, pp. 1-32, Denver, CO, USA.

ON Semiconductor, Cost Effective Power Factor Controller, NCP1606, Mar. 2007, Rev. 3, pp. 1-22, Denver, CO, USA.

Renesas, Power Factor Correction Controller IC, HA16174P/FP, Rev. 1.0, Jan. 6, 2006, pp. 1-38, Tokyo, Japan.

Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.

STMicroelectronics, Electronic Ballast with PFC using L6574 and L6561, Application Note AN993, May 2004, pp. 1-20, Geneva, Switzerland.

Maksimovic, et al, Impact of Digital Control in Power Electronics, International Symposium on Power Semiconductor Devices and ICS, 2004, pp. 2-22, Boulder, Colorado, USA.

Fairchild Semiconductor, Ballast Control IC, FAN 7711, Rev. 1.0.3, 2007, pp. 1-23, San Jose,California, USA.

Yao, Gang et al, Soft Switching Circuit for Interleaved Boost Converters, IEEE Transactions on Power Electronics, vol. 22, No. 1, Jan. 2007, pp. 1-8, Hangzhou China.

STMicroelectronics, Transition Mode PFC Controller, Datasheet L6562, Rev. 8, Nov. 2005, pp. 1-16, Geneva, Switzerland.

Zhang, Wanfeng et al, A New Duty Cycle Control Strategy for Power Factor Correction and FPGA Implementation, IEEE Transactions on Power Electronics, vol. 21, No. 6, Nov. 2006, pp. 1-10, Kingston, Ontario, Canada.

STMicroelectronics, Power Factor Connector L6561, Rev 16, Jun. 2004, pp. 1-13, Geneva, Switzerland.

Texas Instruments, Avoiding Audible Noise at Light Loads when Using Leading Edge Triggered PFC Converters, Application Report SLUA309A, Mar. 2004—Revised Sep. 2004, pp. 1-4, Dallas, Texas, USA.

Texas Instruments, Startup Current Transient of the Leading Edge Triggered PFC Controllers, Application Report SLUA321, Jul. 2004, pp. 1-4, Dallas, Texas, USA.

Texas Instruments, Current Sense Transformer Evaluation UCC3817, Application Report SLUA308, Feb. 2004, pp. 1-3, Dallas, Texas, USA.

Texas Instruments, BiCMOS Power Factor Preregulator Evaluation Board UCC3817, User's Guide, SLUU077C, Sep. 2000—Revised Nov. 2002, pp. 1-10, Dallas, Texas, USA.

Texas Instruments, Interleaving Continuous Conduction Mode PFC Controller, UCC28070, SLUS794C, Nov. 2007—Revised Jun. 2009, pp. 1-45, Dallas, Texas, USA.

Texas Instruments, 350-W Two-Phase Interleaved PFC Pre-regulator Design Review, Application Report SLUA369B, Feb. 2005—Revised Mar. 2007, pp. 1-22, Dallas, Texas, USA.

Texas Instruments, Average Current Mode Controlled Power Factor Correction Converter using TMS320LF2407A, Application Report SPRA902A, Jul. 2005, pp. 1-15, Dallas, Texas, USA.

Texas Instruments, Transition Mode PFC Controller, UCC28050, UCC28051, UCC38050, UCC38051, Application Note SLUS515D, Sep. 2002—Revised Jul. 2005, pp. 1-28, Dallas, Texas, USA.

Unitrode, High Power-Factor Preregulator, UC1852, UC2852, UC3852, Feb. 5, 2007, pp. 1-8, Merrimack, Maine, USA.

Unitrode, Optimizing Performance in UC3854 Power Factor Correction Applications, Design Note DN 39E, 1999, pp. 1-6, Merrimack, Maine, USA.

ON Semiconductor Four Key Steps to Design a Continuous Conduction Mode PFC Stage Using the NCP1653, Application Note AND8184/D, Nov. 2004, pp. 1-8, Phoenix, AZ, USA.

Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.

Unitrode, UC3854A/B and UC3855A/B Provide Power Limiting with Sinusoidal Input Current for PFC Front Ends, SLUA196A, Design Note DN-66, Jun. 1995—Revised Nov. 2001, pp. 1-6, Merrimack, Maine, USA.

Unitrode, Programmable Output Power Factor Preregulator, UCC2819, UCC3819, SLUS482B, Apr. 2001—Revised Dec. 2004, pp. 1-16, Merrimack, Maine, USA.

Texas Instruments, UCC281019, 8-Pin Continuous Conduction Mode (CCM) PFC Controller, SLU828B, Revised Apr. 2009, pp. 1-48, Dallas, Texas, USA.

http://toolbarpdf.com/docs/functions-and-features-of=inverters. html, Jan. 20, 2011, pp. 1-8.

Zhou, Jinghai, et al, Novel Sampling Algorithm for DSP Controlled 2kW PFC Converter, IEEE Transactions on Power Electronics, vol. 16, No. 2, Mar. 2001, pp. 1-6, Hangzhou, China.

Mammano, Bob, Current Sensing Solutions for Power Supply Designers, Texas Instruments, 2001, pp. 1-36, Dallas, Texas, USA.

Fairchild Semiconductor, Ballast Control IC FAN7532, Rev. 1.0.3, Jun. 2006, pp. 1-16, San Jose, California, USA.

Fairchild Semiconductor, Simple Ballast Controller, FAN7544, Rev. 1.0.0, Sep. 21, 2004, pp. 1-14, San Jose, California, USA.

* cited by examiner

CONTROLLING POWER FACTOR IN A SWITCHING POWER CONVERTER OPERATING IN DISCONTINUOUS CONDUCTION MODE

BACKGROUND OF THE INVENTION

1. Field of the Invention

The present invention relates in general to the field of electronics, and more specifically to a system and method for controlling power factor in a switching power converter operating in discontinuous conduction mode.

2. Description of the Related Art

Various standards bodies establish consumer product energy efficiency standards, such as power quality. Power Factor (PF) is one measure of power quality and represents a measure of how efficiently energy is drawn from an alternating current (AC) source. For example, the Energy Start 80 Plus Platinum standard specifies that products must exceed a power factor of 0.9 from 50% to 100% of maximum power load. Power supply designers often use active power factor correction (PFC) circuits to meet the PF requirements.

Figure 1:
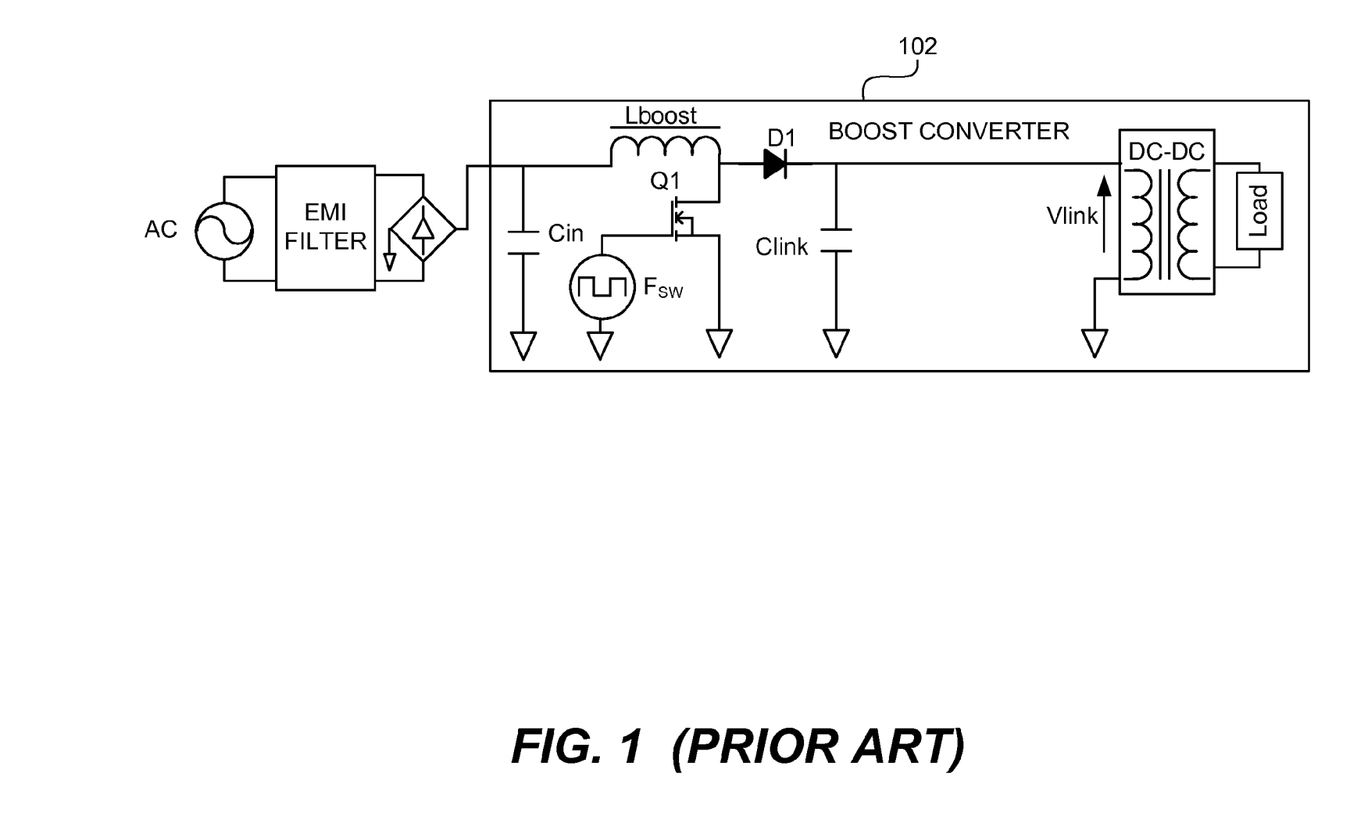
FIG. 1 depicts a boost-type switching power converter.

FIG. 1 depicts a boost-type switching power converter, which converts an input voltage from an AC voltage source into a boosted output voltage supplied of the load. The AC input voltage passes through an optional electro-magnetic interference (EMI) filter and then a rectifier. The rectified AC voltage is the input to the boost converter which includes the input and output capacitors (respectively, $C_{in}$ and $C_{link}$), the complimentary switches (Q1 and D1) and the inductor ($L_{Boost}$). The output voltage of the boost converter, VLink, is a DC regulated voltage that is commonly used as the input voltage to an isolated DC-DC converter stage.

The key principle that drives the boost converter is the tendency of an inductor to resist changes in current. When being charged, the inductor $L_{Boost}$ accumulates energy, when being discharged the inductor $L_{Boost}$ transfers the accumulated energy acting like a source. The voltage produced by the inductor $L_{Boost}$ during the discharge phase is related to the rate of change of current and not to the original charging voltage, thus allowing different input and output voltages.

FET Q1 is driven by a pulse width modulated signal, having a frequency of $F_{SW}$, applied at the gate of the FET Q1. In a charging phase, the FET Q1 is ON, resulting in an increase in the inductor current ($di=v/L \cdot dt$). In the discharging phase, the FET Q1 is OFF and the only path for the inductor current is through the fly-back diode D1, the capacitor Clink and the load (DC-DC converter), which results in transferring the energy accumulated by the inductor $L_{Boost}$ during the charging phase into the output capacitor Clink. The input current is the same as the inductor current.

Figure 2:
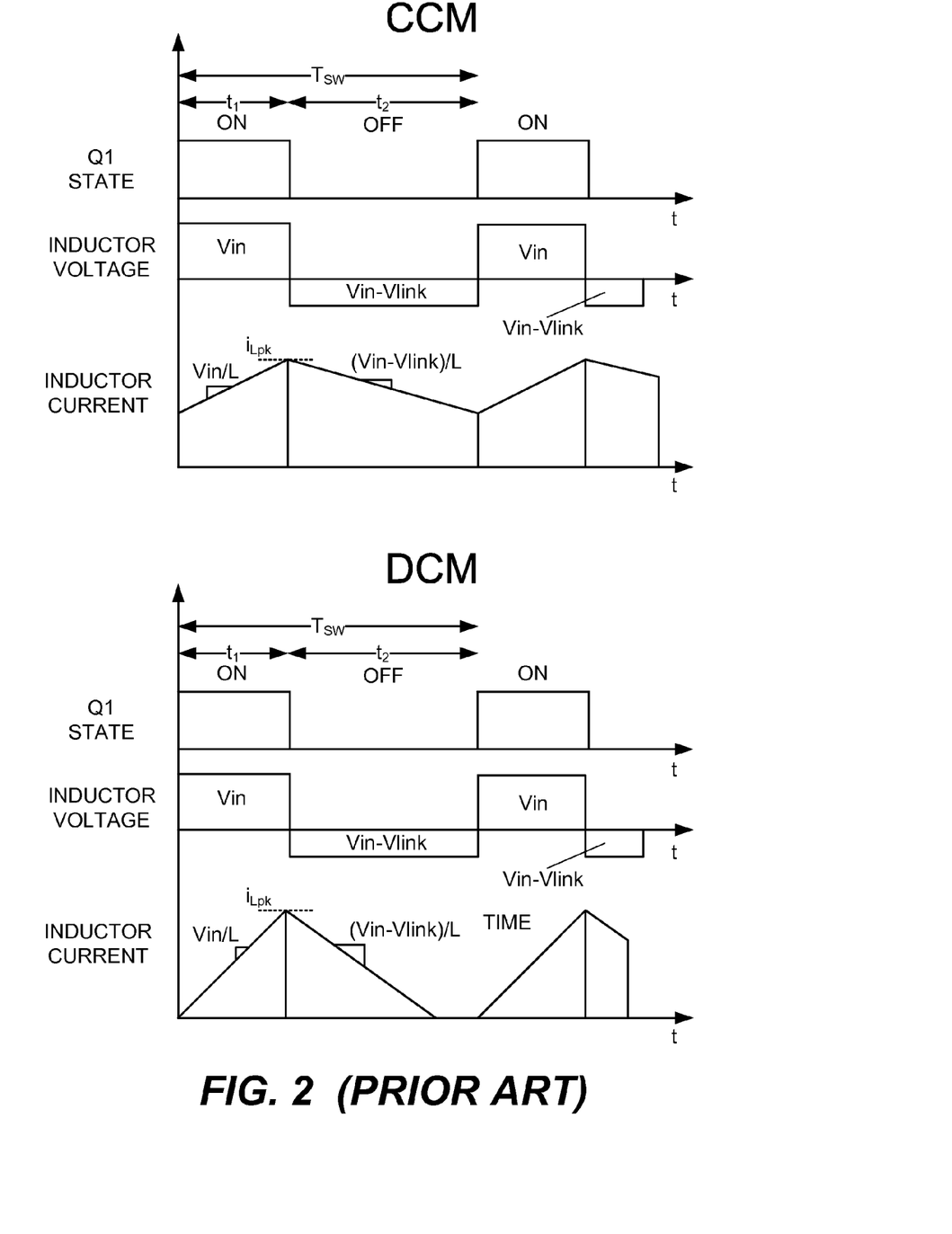
FIG. 2 depicts representative waveforms associated with two different operating modes for the boost converter of FIG. 1.

FIG. 2 depicts representative waveforms associated with two different operating modes for the boost converter depending on the inductor current shape. If the current through the inductor $L_{Boost}$ at the end of the discharging phase does not fall to zero, the boost converter operates in continuous mode (CCM); otherwise, the boost converter operates is discontinuous conduction mode (DCM).

The respective CCM and DCM control techniques have their advantages and disadvantages, however, for low power applications, less than 200-300 watts, DCM offers significant performances and efficiency benefits with simpler control algorithms.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a power system includes a controller to control a switching power converter, and the controller is configured to automatically transition operation of the switching power converter, during each cycle of an input voltage to the switching power converter, between operating in discontinuous conduction mode and critical conduction mode.

Figure 3:
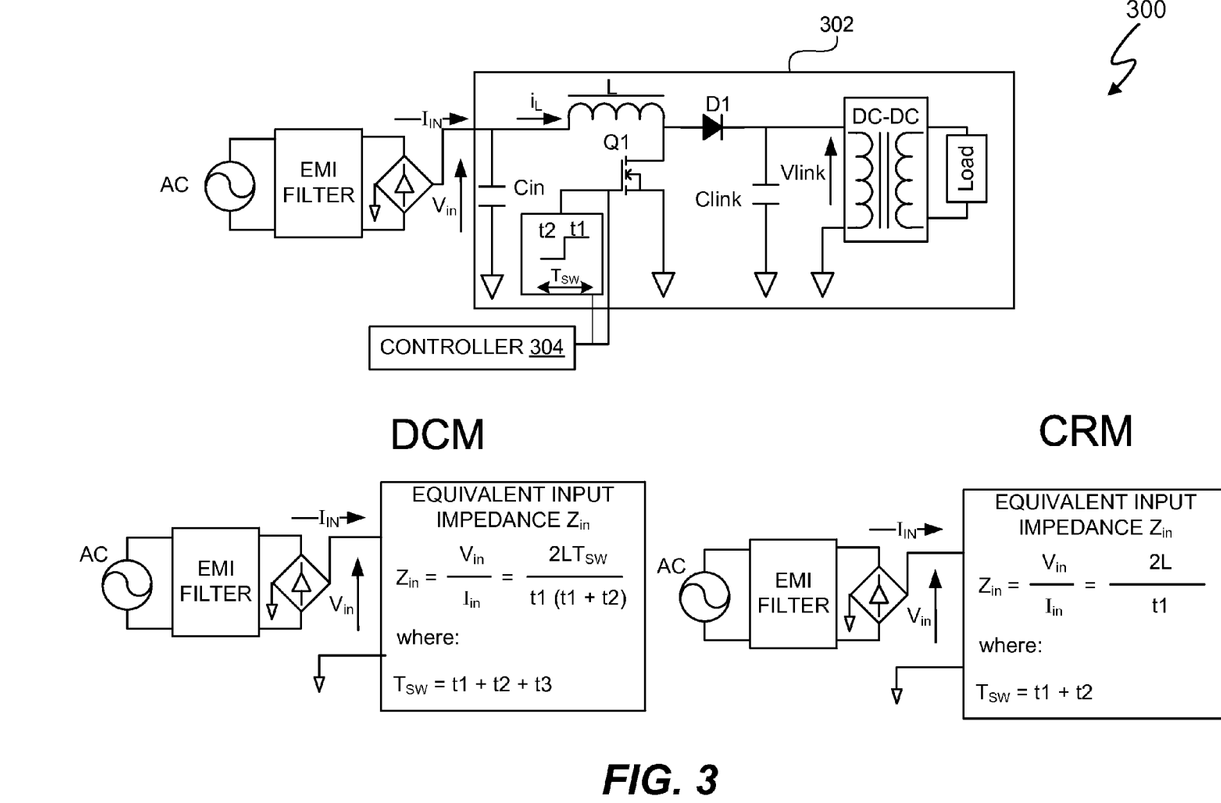
FIG. 3 depicts an electronic system with a boost-type switching power converter.

FIG. 3 depicts an electronic system 300 with a boost-type switching power converter. DCM & CRM Operation Mode:

The input filter capacitor Cin and EMI filter absorb the high-frequency component of the inductor current $i_L$, which makes the input current $I_{in}$ a low frequency signal in DCM mode given by:

$$I_{in} = i_{L,avg} = i_{L,pk} \frac{t_1 + t_2}{2T_{SW}} \qquad \text{Equation 1}$$

where $I_{in}$ is the input current to the switching power converter 300, $i_{L,avg}$ is the average inductor current, $i_{L,pk}$ is the peak inductor current, t1 is the ON TIME of the switch Q1, t2 is the OFF TIME of the switch Q1, and $T_{SW}$ is the switching period of the switch Q1. The input impedance $Z_{in}$ in DCM mode is given by:

$$Z_{in} = \frac{V_{in}}{I_{in}} = V_{in} \frac{L}{V_{in}} \frac{2T_{SW}}{t_1(t_1+t_2)} = \frac{2LT_{SW}}{t_1(t_1+t_2)} \qquad \text{Equation 2a}$$

where:

$$i_{L,pk} = \frac{V_{in}}{L} t_1$$

where $V_{in}$ is the input voltage to the switching power converter 300 and $I_{in}$ is the input current to the switching power converter 300. Power factor correction requires the boost controller to maintain the input impedance constant (or slowly varying). Making t3 zero (where t3 is the time from when the inductor current $i_L$ stops flowing and when the next t1 begins), which is a special case of DCM, simplifies eq. (2a):

$$T_{SW} = t_1 + t_2 \qquad \text{Equation 2b}$$

$$i_{L,pk} = \frac{V_{in}}{L} t_1$$

-continued hence $$I_{in} = \frac{V_{in}}{2L} t_1$$

$$Z_{in} = \frac{V_{in}}{I_{in}} = \frac{2L}{t_1}$$

This special DCM mode is called Critical Conduction Mode, CRM. CRM operates at the boundary between DCM and CCM mode.

As seen in eq. (2b), CRM control is very simple; PFC is achieved by simply keeping t1 constant. Most of the conunercial DCM PFC controllers operate in CRM mode. NOTE: references to CRM mode means time t3 equals 0. If time t3 is non-zero, the switching power converter operates in DCM mode. DCM needs higher peak inductor current $i_L$ comparing to CRM for the same power. Thus, CRM is generally preferred at around the sinusoidal peak but to avoid high switching frequencies DCM is preferred close to the line troughs.

Maximum Power

Regardless of the operational mode, to limit the maximum peak current to the same level as for a CRM controller, at minimum input voltage $V_{IN}$, min and maximum power demand Pmax, the controller operates the switching power converter in CRM mode at the peak of the line input voltage. Assuming a perfect power factor correction and 100% efficiency, the maximum power is given by:

$$P_{max} = \frac{1}{2} \frac{V_{in,min,rms}^2}{L f_{sw,max}} \left( \frac{V_{link}}{V_{link} - V_{in,min,pk}} \right) \qquad \text{Equation 3}$$

Where $V_{IN}$,min is the Minimum input voltage, •Vlink is the output voltage of the switching power converter, L is Boost Inductor inductance value. and fsw,max is the switching frequency $1/T_{SW}$ at the peak of the line input voltage.

The switching frequency is a constant and not generally accessible by a user of the controller, thus, the maximum power for a specific application is setup by the value of the boost inductor. Any positive variation on the inductor, due to manufacture tolerances and/or in the input line, due to demand peaks in the power distribution network, will limit the maximum power available. To compensate, the designers often oversize the inductor value L, sometimes by more than 40%, resulting in non-optimal operating conditions with performance degradation especially in efficiency and EMI compatibility.

In at least one embodiment, to solve the maximum power problem and maintain the same inductor peak current levels compared to a CRM solution, a switching algorithm, such as the switching algorithm 500 (FIG. 5), controls the switching frequency of switch Q1 in FIG. 3 and auto-adapts the switching frequency of switch Q1 and operates the switching power converter 300 in, or close to, CRM mode (i.e. constant t1 and variable switching frequency fsw) when the power demand by the load is larger than the power available in DCM mode. The next section describes the original and modified algorithm.

Original Algorithm Control Rules

For each switching cycle, the controller calculates:

The switching period Tsw, using the DCM switching period rule of Equation 4. The switching frequency basically follows the input line voltage profile; minimum at the trough and maximum at the peak of the line voltage.

The FET ON Time, t1, using the DCM ON-TIME control rule. The ON-TME includes 2 parts, slow (Equation 5) and fast (Equation 6) varying parts compared to the input line voltage period. The slow part (Equation 5), calculated twice per input line voltage period, includes the DC link voltage, RMS input voltage and load demand. The fast part (Equation 6), calculated once per switching period, includes instantaneous input/link voltages and calculated switching period.

$$T_{SW}(n) = TT_{min}\left(2 - \frac{v_{in}(n)}{V_{in,pk}}\right) \qquad \text{Equation 4}$$

$$C_{halflinecycle} = TT_{min} \times \left(\frac{V_{in,pk,min}}{V_{in,pk}}\right)^2 \times \left(\frac{V_{link} - V_{in,pk,min}}{V_{link}^2}\right) \times P_u \qquad \text{Equation 5}$$

$$t_1(n) = \sqrt{C_{halflinecycle} T_{SW}(n)(V_{link}(n) - v_{in}(n))} \qquad \text{Equation 6}$$

Figure 4:
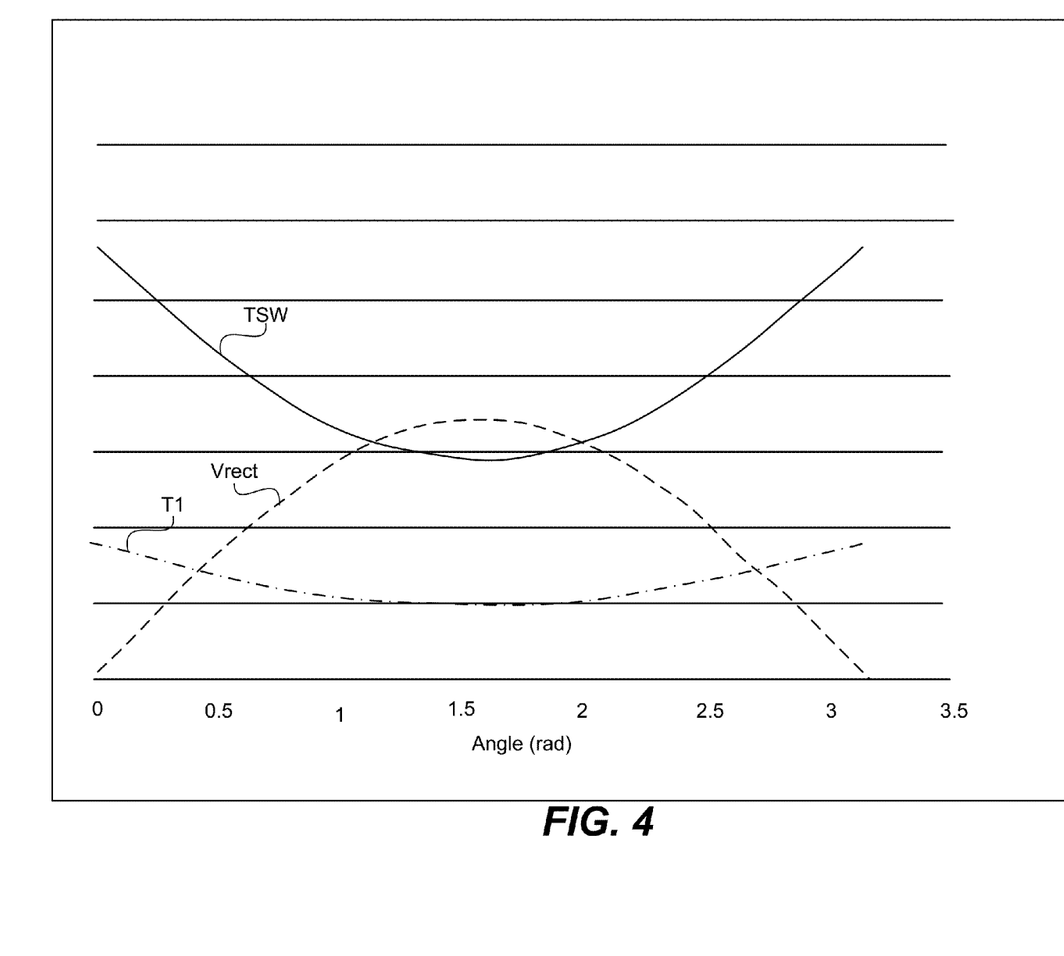
FIG. 4 depicts an exemplary rectified input voltage, ON-TIME t1, and switching period $T_{SW}$.

FIG. 4 depicts an exemplary rectified input voltage, ON-TIME t1, and switching period $T_{SW}$ for a specific input line and load configuration.

New Algorithm Control Rules

The relationship between ON-TIME, t1 of switch Q1 of FIG. 3, and switching period, Tsw,cr in critical mode of switch Q1 is given by:

$$T_{SW,cr} = t_1 \frac{V_{link}}{V_{link} - v_{in}} \qquad \text{Equation 7}$$

Figure 5:
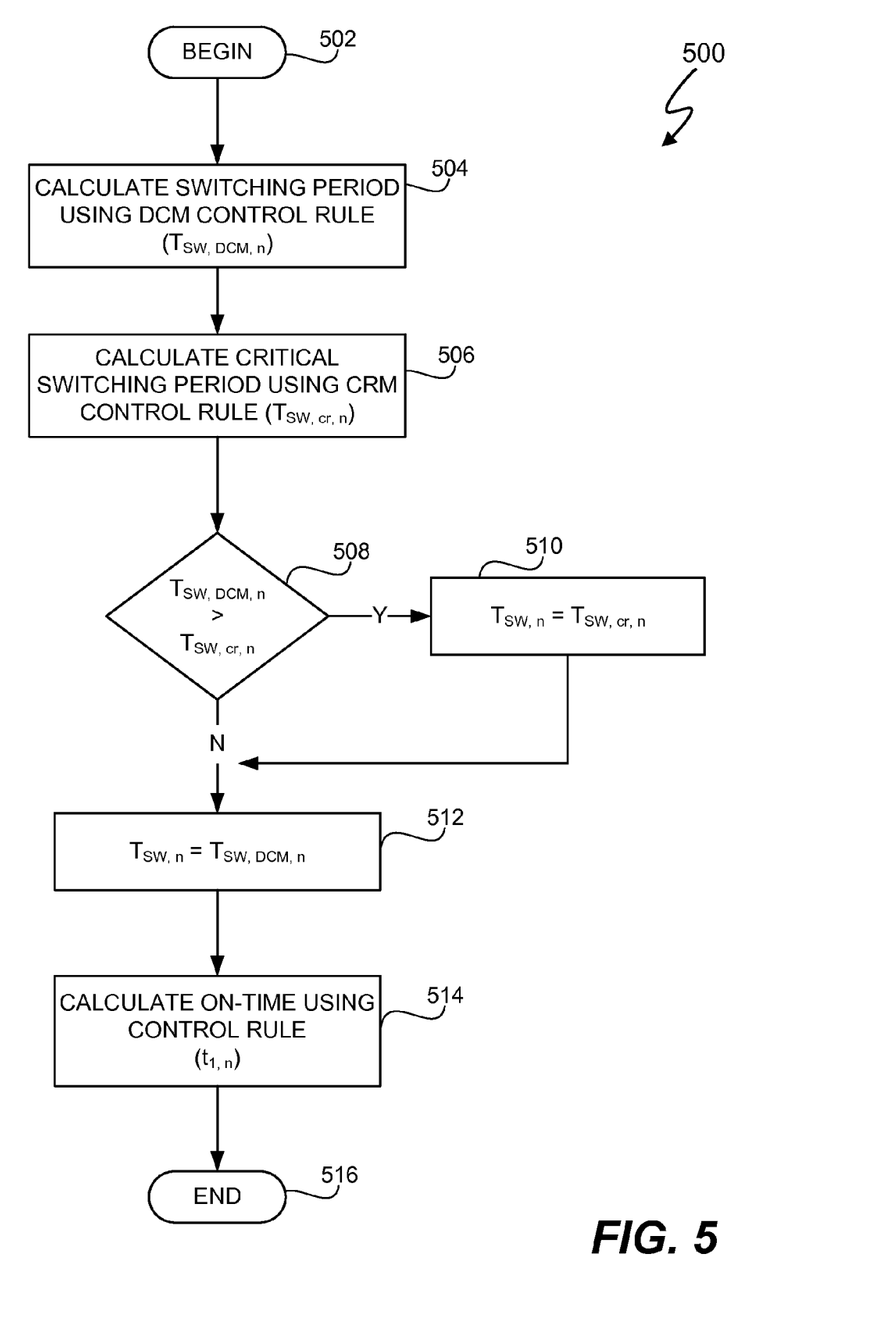
FIG. 5 depicts a switching algorithm that calculates a pulse width t1 and switching period T for the $n^{th}$ switching cycle of a switch of the switching power converter of FIG. 3.

An increase on the power demand increases the ON-TIME (Equation 6), which increases the critical switching period (Equation 7). The critical switching period is used if larger than the calculated DCM switching period (Equation 4). Using the larger period results in more power transferred (Equation 3). FIG. 5 depicts the switching algorithm 500 that calculates a pulse width t1 and switching period T for the $n^{th}$ switching cycle of switch Q1 in FIG. 3. For the cases where the critical switching period is selected, the ON-TIME $t_1(n)$ for the $n^{th}$ cycle of the switch Q1 is defined as:

$$t_1(n) = C_{halflinecycle} V_{link}(n) \qquad \text{Equation 8)}$$

Because Vlink is a slow moving signal, the ON-TIME can be approximated to a constant which fills the power factor correction requirement. The new algorithm fulfills:

Auto adapts between CRM and DCM mode depending on power transfer requirements.

Performs power factor correction independent on operating mode.

The switching algorithm 500 begins at operation 502 and proceeds to operation 504. Operation 504 calculates the $n^{th}$ switching period using the DCM control rule ($T_{SW,DCM,n}$). Operation 506 calculates the $n^{th}$ critical switching period using the CRM control rule ($T_{SW,cr,n}$). Operation 508 determines if the switching period using the DCM control rule $T_{SW,DCM,n}$ is greater than the switching period using the CRM control rule $T_{SW,cr,n}$. If the $n^{th}$ switching period using the DCM control rule $T_{SW,DCM,n}$ is greater than the $n^{th}$ switching period using the CRM control rule $T_{SW,cr,n}$, then operation 510 selects the $n^{th}$ switching period $T_{SW,n}$ to equal the switching period $T_{SW,cr,n}$ calculated using the CRM control rule. If the $n^{th}$ switching period using the DCM control rule $T_{SW,DCM,n}$ is less than the $n^{th}$ switching period using the CRM control rule $T_{SW,cr,n}$, then operation 510 selects the $n^{th}$ switching period $T_{SW,n}$ to equal the switching period $T_{SW,DCM,n}$ calculated using the DCM control rule. Operation 514 then calculates the on-time $t_{1,n}$ for the $n^{th}$ switching period using the control rule associated with the switching period determined in operation 508.

Figure 6:
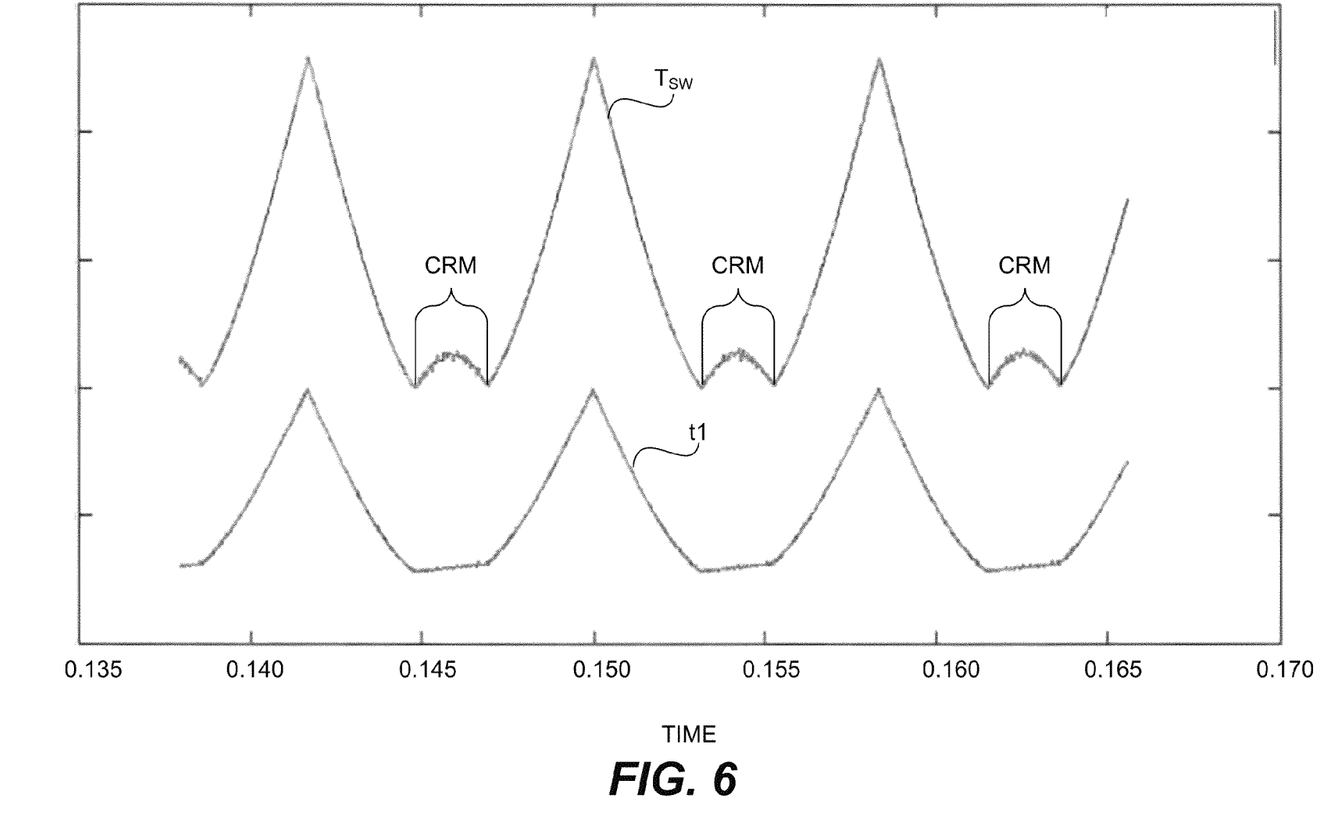
FIGS. 6 and 7 depict DCM and CRM simulation results for a full load and minimum input voltage.
Figure 7:
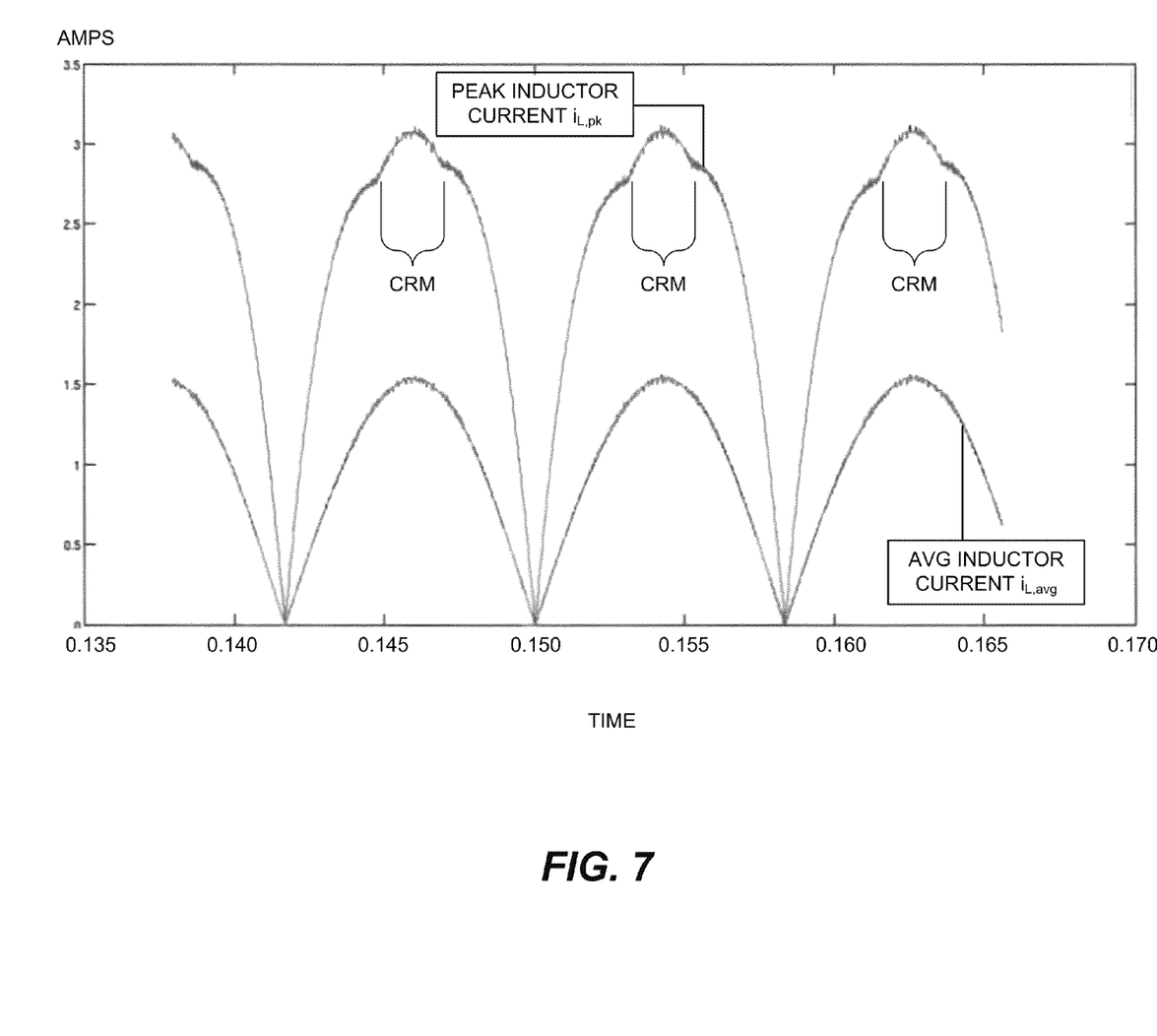

FIGS. 6 and 7 depict DCM and CRM simulation results for a full load and minimum input voltage. The boost inductor value L was increased by 20% to reduce available power. To deliver the requested power of 120% of maximum rated power near the peak of the line input voltage, the controller of FIG. 3 switches to CRM mode as indicated by an approximately constant t1 and increased switching period $T_{SW}$. The inductor peak current $i_{L,pk}$ increases but the inductor average current $i_{L,avg}$ (i.e. input current) retains a sinusoidal shape.

Although embodiments have been described in detail, it should be understood that various changes, substitutions, and alterations can be made hereto without departing from the spirit and scope of the invention as defined by the appended claims.

What is claimed is:

1. An apparatus comprising:
    a controller to control a switching power converter, wherein the controller is configured to automatically transition operation of the switching power converter, during each cycle of an input voltage to the switching power converter, between operating in discontinuous conduction mode and critical conduction mode, wherein during each cycle of a control signal to a switch that controls power delivered to a load coupled to the switching power converter, to automatically transition operation of the switching power converter between operating in discontinuous conduction mode and critical conduction mode, the controller is configured to:
        determine a first period of a control signal to a switch of the switching power converter in accordance with a discontinuous conduction mode control rule, wherein the switch controls power delivered to an output of the switching power converter;
        determine a second period of the control signal in accordance with a critical conduction mode control rule;
        compare the first period and the second period;
        set an actual period of the control signal equal to the first period if the first period is less than the second period and set an actual period of the control signal equal to the second period if the first period is greater than the second period; and
        calculate an ON time of the switch in accordance with one of: (i) the discontinuous conduction mode control rule if the actual period is set to the first period and (ii) the critical conduction mode control rule if the actual period is set to the second period.

2. The apparatus of claim 1 wherein the controller is further configured to operate the switching power converter in critical conduction mode when a determined switching period of the switch in the switching power converter that controls power delivered to the load of the switching power converter is more efficient than a determined switching period of the switch for operating the switching power converter in discontinuous conduction mode.

3. The apparatus of claim 1 further comprising:
    the switching power converter coupled to the controller, and
    the load coupled to the switching power converter.

4. The apparatus of claim 3 wherein the load comprises a light emitting diode.

5. A method comprising:
    controlling a switching power converter to automatically transition operation of the switching power converter, during each cycle of an input voltage to the switching power converter, between operating in discontinuous conduction mode and critical conduction mode, wherein to automatically transition operation of the switching power converter, during each cycle of an input voltage to the switching power converter, between operating in discontinuous conduction mode and critical conduction mode comprises:
        determining a first period of a control signal to a switch of the switching power converter in accordance with a discontinuous conduction mode control rule, wherein the switch controls power delivered to an output of the switching power converter;
        determining a second period of the control signal in accordance with a critical conduction mode control rule;
        comparing the first period and the second period;
        setting an actual period of the control signal equal to the first period if the first period is less than the second period and set an actual period of the control signal equal to the second period if the first period is greater than the second period; and
        calculating an ON time of the switch in accordance with one of: (i) the discontinuous conduction mode control rule if the actual period is set to the first period and (ii) the critical conduction mode control rule if the actual period is set to the second period.

6. The method of claim 5 wherein the method further comprises:
    operating the switching power converter in critical conduction mode when a determined switching period of a switch in the switching power converter that controls power delivered to a load of the switching power converter is more efficient than a determined switching period of the switch for operating the switching power converter in discontinuous conduction mode.

7. The method of claim 5 further comprising:
    providing power from the switching power converter to a load.

8. The method of claim 7 wherein the load comprises a light emitting diode.

9. A lighting system comprising:
    a switching power converter, wherein the switching power converter include an inductor, a link capacitor coupled to the inductor, and a switch having a first terminal coupled between the inductor and the link capacitor;
    a load coupled to the link capacitor, and
    a controller coupled to a conduction control terminal of the switch, wherein the controller is configured to:
        (a) determine a first period of a control signal for the switch in accordance with a discontinuous conduction mode control rule;
        (b) determine a second period of the control signal for the switch in accordance with a critical conduction mode control rule;
        (c) compare the first period and the second period;
        (d) set an actual period of the control signal equal to the first period if the first period is less than the second period and set an actual period of the control signal equal to the second period if the first period is greater than the second period;

(e) calculate an ON time of the switch in accordance with one of: (i) the discontinuous conduction mode control rule if the actual period is set to the first period and (ii) the critical conduction mode control rule if the actual period is set to the second period; and (f) provide a control signal to the switch, wherein the control signal comprises a period equal to the actual period and a pulse width equal to the ON time calculated.

10. The lighting system of claim 9 wherein the load comprises one or more light emitting diodes.

11. The lighting system of claim 9 wherein the controller is configured to perform (a)-(f) for each cycle of the switch.

12. A method to control a switching power converter and provide power to a load, the method comprising:

(a) determining a first period of a control signal to a switch of the switching power converter in accordance with a discontinuous conduction mode control rule, wherein the switch controls power delivered to an output of the switching power converter;

(b) determining a second period of the control signal in accordance with a critical conduction mode control rule;

(c) comparing the first period and the second period;

(d) setting an actual period of the control signal equal to the first period if the first period is less than the second period and set an actual period of the control signal equal to the second period if the first period is greater than the second period;

(e) calculating an ON time of the switch in accordance with one of: (i) the discontinuous conduction mode control rule if the actual period is set to the first period and (ii) the critical conduction mode control rule if the actual period is set to the second period; and (f) providing a control signal to the switch, wherein the control signal comprises a period equal to the actual period and a pulse width equal to the ON time calculated.

13. The method of claim 12 wherein the load comprises one or more light emitting diodes.

14. The method of claim 12 further comprising:
performing (a)-(f) for each cycle of the switch.

* * * * *